(12) United States Patent
Yamamoto et al.

(10) Patent No.: US 8,622,537 B2
(45) Date of Patent: Jan. 7, 2014

(54) SOLVENT FOR INK, METHOD FOR PRODUCING SOLVENT FOR INK, INK FOR INKJET RECORDING, METHOD FOR PRODUCING INK FOR INKJET RECORDING, INK CARTRIDGE, AND METHOD FOR PRODUCING INK CARTRIDGE

(75) Inventors: Hirotaka Yamamoto, Chiba (JP); Keiji Hosoi, Chiba (JP)

(73) Assignee: Seiko I Infotech Inc. (JP)

( * ) Notice: Subject to any disclaimer, the term of this patent is extended or adjusted under 35 U.S.C. 154(b) by 0 days.

(21) Appl. No.: 13/637,069

(22) PCT Filed: Mar. 24, 2011

(86) PCT No.: PCT/JP2011/057173
§ 371 (c)(1),
(2), (4) Date: Dec. 7, 2012

(87) PCT Pub. No.: WO2011/125516
PCT Pub. Date: Oct. 13, 2011

(65) Prior Publication Data
US 2013/0076840 A1 Mar. 28, 2013

(30) Foreign Application Priority Data

Apr. 1, 2010 (JP) .................................. 2010-085454
Feb. 2, 2011 (JP) .................................. 2011-020843

(51) Int. Cl.
*G01D 11/00* (2006.01)

(52) U.S. Cl.
USPC ........................................... 347/100

(58) Field of Classification Search
USPC ..................... 347/86, 100; 252/364, 634, 644
See application file for complete search history.

(56) References Cited

U.S. PATENT DOCUMENTS

| 4,594,174 | A  | * | 6/1986  | Nakayama et al. | ........ 252/62.54 |
| 4,880,692 | A  | * | 11/1989 | Ryoke et al.    | .................. 428/323 |
| 6,617,008 | B1 | * | 9/2003  | Kono et al.     | ................ 428/195.1 |
| 7,879,524 | B2 | * | 2/2011  | Soejima et al.  | ............... 430/200 |

* cited by examiner

*Primary Examiner* — Anh T. N. Vo
(74) *Attorney, Agent, or Firm* — Adams & Wilks

(57) ABSTRACT

An ink vehicle having a vinyl chloride-vinyl acetate copolymer resin produced by suspension polymerization. In the production of the ink vehicle, the vinyl chloride-vinyl acetate copolymer resin is partially dissolved in a solvent in a state in which an undissolved gel-like component of the vinyl chloride-vinyl acetate copolymer resin is present in the resin. An external force is applied to the solvent containing the gel-like component to dissolve the gel-like component in the solvent.

20 Claims, 1 Drawing Sheet

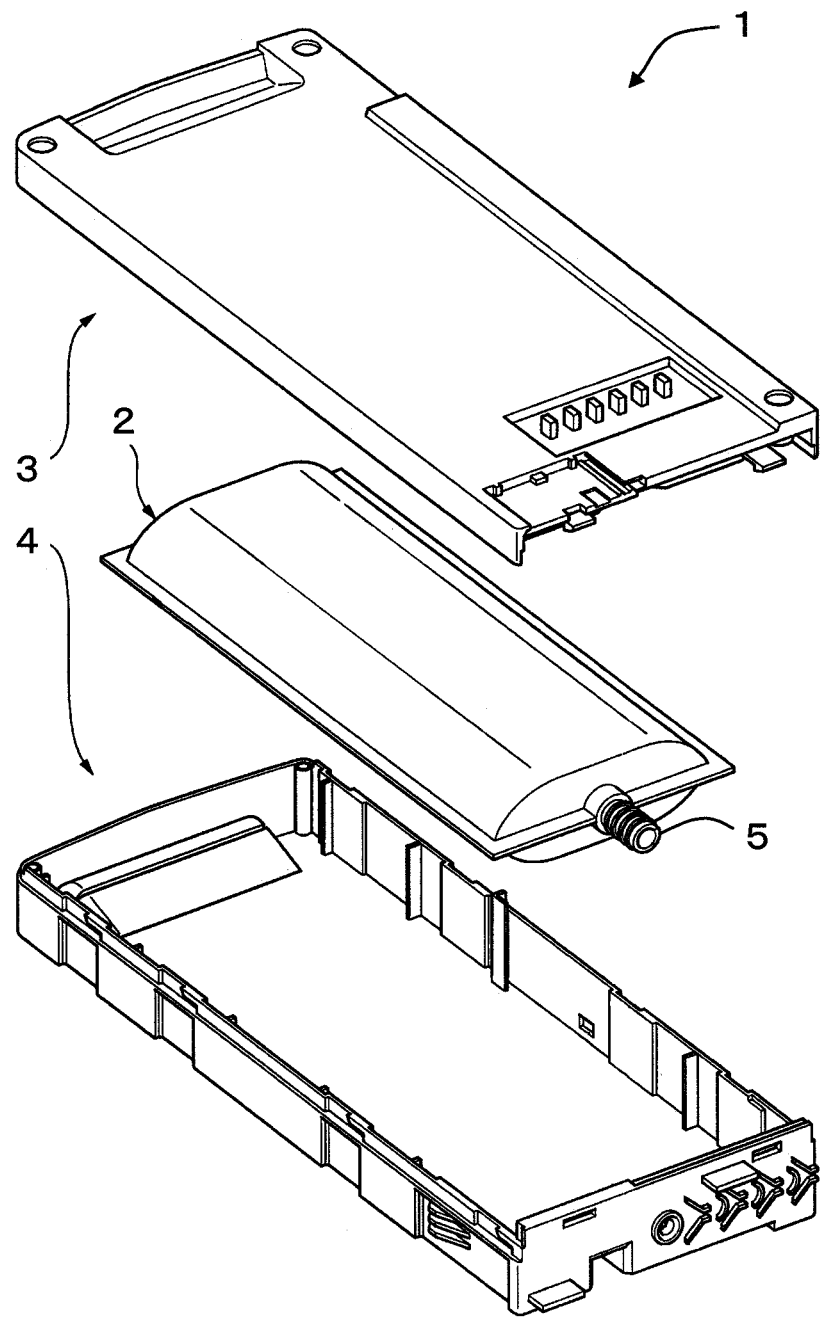

SOLVENT FOR INK, METHOD FOR PRODUCING SOLVENT FOR INK, INK FOR INKJET RECORDING, METHOD FOR PRODUCING INK FOR INKJET RECORDING, INK CARTRIDGE, AND METHOD FOR PRODUCING INK CARTRIDGE

CROSS-REFERENCE TO RELATED APPLICATIONS

This application is a U.S. national stage application of International Application No. PCT/JP2011/057173 filed Mar. 24, 2011, claiming a priority date of Apr. 1, 2010, and published in a non-English language.

TECHNICAL FIELD

1. Background of the Invention

The present invention relates to a vehicle for an ink in which a binder resin is dissolved, a production method for the vehicle for an ink, an ink for inkjet recording to be used in an inkjet recording apparatus, a production method for the ink for inkjet recording, an ink cartridge, and a production method for the ink cartridge.

2. Background Art

Emphasis has been placed on the light fastness and weatherability of an ink required for an application such as an outdoor poster. A pigment ink using a pigment as a colorant has been used as such ink. Emphasis has also been placed on the light fastness and weatherability of a recording medium for the application because the recording medium is placed outdoors. Accordingly, a sheet-like base material made of aplastic such as a polyvinyl chloride resin has been used. Not a general aqueous ink for inkjet recording obtained by adding a colorant such as a water-soluble dye to water but a solvent ink for inkjet recording using a pigment as a colorant and using an organic solvent as a vehicle has been mainly used as an ink for inkjet recording for performing recording on such recording medium. The ink for inkjet recording is typically supplied in a state of being stored in an ink cartridge.

A vinyl chloride-vinyl acetate copolymer resin excellent in adhesion to a polyvinyl chloride resin base material is often used as a binder resin for the solvent ink for inkjet recording. An ink using a vehicle that dissolves the vinyl chloride-vinyl acetate copolymer resin well and also dissolves the polyvinyl chloride resin as the base material has been known. For example, such an ink using a lactone-based solvent in combination as described in JP 2007-23265 A has been developed.

In recent years, a recording apparatus using the solvent ink for inkjet recording has been used even in a business office such as a general office, and hence additional consideration must be given to the safety, harmfulness, and odor of the ink. Accordingly, glycol monoacetates and glycol ethers have each been generally used as a main solvent for the ink. However, a raw material and production method for the binder resin have shifted to ones giving consideration to a global environment, and the solubility of the resin in such organic solvent may have reduced. In particular, a vinyl chloride-vinyl acetate copolymer resin produced by suspension polymerization has been reduced in solubility in such organic solvent. The vinyl chloride-vinyl acetate copolymer resin produced by the suspension polymerization is of such a structure as to hardly dissolve in the organic solvent because the resin is substantially free of voids.

Further, a water-soluble dispersant has been generally used upon production of the vinyl chloride-vinyl acetate copolymer resin by the suspension polymerization, which is responsible for the reduction of the solubility of the vinyl chloride-vinyl acetate copolymer resin in the organic solvent. A water-soluble resin, e.g., a water-soluble cellulose ether such as a hydroxyalkyl alkyl cellulose, a water-soluble cellulose ester such as a methylcellulose, a hydroxyethyl cellulose, or a hydroxypropyl cellulose, or a water-soluble polymer such as a partially saponified polyvinyl alcohol, an acrylic acid polymer, or gelatin has been generally used as the water-soluble dispersant. Such dispersant hardly dissolves in a specific organic solvent, and depending on its addition amount, the dispersant may remain to inhibit the dissolution of the vinyl chloride-vinyl acetate copolymer resin in the organic solvent.

A possible approach to solving the problem is to increase the amount of the lactone-based solvent. However, the use of a large amount of the lactone-based solvent excessively dissolves the surface of the base material made of the polyvinyl chloride resin. As a result, the glossiness of the surface of a printed matter is impaired, and moreover, the corrosion of a member for a recording head and of a member for the recording apparatus is induced in some cases.

In addition, the solubility of the binder resin is improved by, for example, lengthening a stirring time or increasing a temperature in an ink production process. However, the foregoing approach does not suffice for obtaining such solubility that the performance by which the ink is stably ejected from the recording head is obtained. The plain truth is that an undissolved component of the binder resin or a gel-like undissolved component in which the ink pigment adheres to the undissolved component of the binder resin remains. Further, such gel-like undissolved component is extremely hard to remove by filtration because the component is soft and changes its shape to pass a gap of a filter. The gel-like undissolved component is responsible for an ejection failure of the recording head.

CITATION LIST

Patent Literature

[PTL 1] JP 2007-23265 A

SUMMARY OF INVENTION

The present invention has been made to solve such problems as described above, and an object of the present invention is to provide a vehicle for an ink for inkjet recording using a vinyl chloride-vinyl acetate copolymer resin produced by suspension polymerization as a binder resin, the vehicle being excellent in adhesion to a polyvinyl chloride resin base material and in stability of ejection from a recording head, and a production method for the vehicle. Another object of the present invention is to provide an ink for inkjet recording using the vehicle and a production method for the ink, and an ink cartridge and a production method for the ink cartridge.

In order to achieve the object, a production method for a vehicle for an ink according to the present invention includes partially dissolving a vinyl chloride-vinyl acetate copolymer resin produced by suspension polymerization as a binder resin in a solvent to such a state that an undissolved gel-like component thereof is incorporated, and applying an external force to the solvent containing the gel-like component to dissolve the gel-like component in the solvent.

Further, the external force includes ultrasonic wave irradiation by an ultrasonic wave irradiation apparatus or media dispersion by a media disperser.

A production method for an ink for inkjet recording according to the present invention includes the step of adding a vehicle for an ink produced by the above-mentioned production method to a pigment dispersion having at least a pigment and a pigment dispersant.

An ink for inkjet recording according to the present invention includes at least a vehicle for an ink produced by the above-mentioned production method, a pigment, and a pigment dispersant.

An ink for inkjet recording according to the present invention is a vehicle for an ink, including a vinyl chloride-vinyl acetate copolymer resin dissolved in a solvent, in which: the vinyl chloride-vinyl acetate copolymer resin is produced by suspension polymerization; and an external force is applied in a state where an undissolved gel-like component of the vinyl chloride-vinyl acetate copolymer resin is present in the solvent to dissolve the gel-like component.

An ink cartridge according to the present invention includes: a pouch storing the above-mentioned ink for inkjet recording; and a case for storing the pouch.

A production method for an ink cartridge according to the present invention includes the steps of: storing an ink for inkjet recording produced by the above-mentioned production method for an ink for inkjet recording in a pouch; and storing the pouch in a case.

When ultrasonic wave irradiation or media dispersion is performed in the step of dissolving a vinyl chloride-vinyl acetate copolymer resin produced by suspension polymerization in an organic solvent, a vehicle for an ink in which the resin is dissolved in the solvent to such a level that there is no problem concerning the stability of continuous ejection by an inkjet head can be obtained. In addition, the use of the vehicle for an ink in an ink for inkjet recording can provide an ink for inkjet recording that is excellent in glossiness of the surface of a printed matter, does not cause the corrosion of a member for a recording head and of a member for a recording apparatus, and is excellent in continuous ejection stability. An ink cartridge that stores the ink is also provided.

BRIEF DESCRIPTION OF DRAWINGS

FIG. 1 is an exploded perspective view of an ink cartridge according to a preferred embodiment of the present invention.

DETAILED DESCRIPTION OF THE INVENTION

Hereinafter, an embodiment of the present invention is described. The embodiment is specifically described with reference to an ink for inkjet recording.

The ink for inkjet recording needs to contain a pigment, a pigment dispersant, a binder resin, and an organic solvent.

Hereinafter, each component of the ink for inkjet recording is described. Various pigments to be used in a printing ink, a paint, and the like can each be used as the pigment to be used in the ink for inkjet recording.

Examples of the pigment include: C.I. Pigment Yellows 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, and 185; C.I. Pigment Oranges 16, 36, 38, 43, 51, 55, 59, 61, 64, 65, and 71; C.I. Pigment Reds 9, 48, 49, 52, 53, 57, 97, 122, 149, 168, 177, 178, 179, 206, 207, 209, 242, 254, and 255; C.I. Pigment Violets 19, 23, 29, 30, 37, 40, and 50; C.I. Pigment Blues 15, 15:1, 15:3, 15:4, 15:6, 22, 30, 64, and 80; C.I. Pigment Greens 7 (chlorinated phthalocyanine green) and 36 (brominated phthalocyanine green); C.I. Pigment Browns 23, 25, and 26; C.I. Pigment Blacks 7 (carbon black), 26, 27, and 28. Specific examples of the pigment include LIONOL BLUEFG-7400G (phthalocyanine pigment manufactured by TOYO INK CO., LTD.), YELLOW PIGMENT E4GN (nickel complex azo pigment manufactured by Bayer AG), Cromophtal Pink PT (quinacridone pigment manufactured by BASF), ELFTEX 415 (carbon black manufactured by Cabot Corporation), Fastogen Super Magenta RG (quinacridone pigment manufactured by DIC Corporation), YELLOW PIGMENT E4GN (nickel complex azo pigment manufactured by LANXESS), MONARCH 1000 (carbon black manufactured by Cabot Corporation), FASTOGEN Super Magenta RG (quinacridone pigment manufactured by Dainippon Ink & Chemicals Inc.), Irgalite Blue 8700 (phthalocyanine pigment manufactured by BASF), and E4GN-GT (nickel complex azo pigment manufactured by LANXESS).

Although the blending amount of the pigment can be arbitrarily determined depending on, for example, the kind of the pigment to be used, its content in the ink is 0.1 to 15 wt %, preferably 0.5 to 10 wt % in ordinary cases. The average particle diameter of the pigment is preferably 50 to 400 nm, more preferably 80 to 300 nm. The average particle diameter is an average particle diameter (d50) measured with a laser diffraction-type particle size distribution-measuring device.

The ink for inkjet recording contains a binder resin so as to be provided with adhesion to a base material. The binder resin may be any one of the binder resins normally used in ordinary inks for inkjet recording and is not particularly limited. Of those, any one of a polyester resin, an acrylic resin, a urethane resin, and a vinyl chloride-vinyl acetate copolymer resin is preferably incorporated because the adhesion to the base material is improved, and the vinyl chloride-vinyl acetate copolymer resin is particularly preferred for adhesion to a polyvinyl chloride-based base material used as a base material to be used in an outdoor poster or the like.

The solubility of the vinyl chloride-vinyl acetate copolymer resin in an organic solvent varies depending on its polymerization method. In particular, the vinyl chloride-vinyl acetate copolymer resin produced by suspension polymerization has been reduced in solubility in such organic solvent. The vinyl chloride-vinyl acetate copolymer resin produced by solution polymerization can be easily dissolved even with a relatively weak stirring force because of the following reason. The particles of the resin have voids, and hence the organic solvent easily permeates into the resin and the resin dissolves like being loosened. On the other hand, the vinyl chloride-vinyl acetate copolymer resin produced by the suspension polymerization has no such voids as observed in the vinyl chloride-vinyl acetate copolymer resin produced by the solution polymerization and the resin gradually dissolves from its surface, and hence the solvent has difficulty in permeating into the central portion of the resin. Accordingly, the resin has difficulty in being dissolved merely by stirring. On the contrary, the particles of the resin whose surface has become soft are apt to coalesce to provide a large lump. In addition, a water-soluble resin, e.g., a water-soluble cellulose ether such as a hydroxyalkyl alkyl cellulose, a water-soluble cellulose ester such as a methyl cellulose, a hydroxyethyl cellulose, or a hydroxypropyl cellulose, or a water-soluble polymer such as a partially saponified polyvinyl alcohol, an acrylic acid polymer, or gelatin is generally used as a dispersant to be used upon production by the suspension polymerization. Such resin hardly dissolves in the organic solvent, and depending on its addition amount, the resin may remain to inhibit the dissolution of the vinyl chloride-vinyl acetate copolymer resin in the organic solvent. An undissolved component of the resin takes in even the pigment in the ink to impair pigment dispersibility. Such undissolved component is extremely hard to remove by filtration because the component is a soft, small gel and is hence apt to deform to pass a gap of a filter medium. The undissolved component is responsible for the impairment of the performance by which the ink is stably ejected from a recording head. From the viewpoint of a global environment, the suspension polymerization involving using water is a more excellent polymerization method for the resin than the solution polymerization involving using an organic solvent as a vehicle is, and the production of the resin by the solution polymerization may be ceased from the viewpoint of the protection of the global environment. Accordingly, a technology for using the vinyl chloride-vinyl acetate copolymer resin produced by the suspension polymerization has been demanded. In view of the foregoing, in order for the vinyl chloride-vinyl acetate copolymer resin produced by the suspension polymerization that hardly dissolved in a solvent to be dissolved, a vehicle for an ink in which the resin was dissolved by means of ultrasonic energy or media dispersion was used in an ink production process to enable the dissolution. The vinyl chloride-vinyl acetate copolymer resin produced by the solution polymerization is specifically, for example, a UCAR Solution Vinyl Resin VYHD, VYHH, or VMCA manufactured by The Dow Chemical Company. In addition, the vinyl chloride-vinyl acetate copolymer resin produced by the suspension polymerization is specifically, for example, a Solbin CL manufactured by Nissin Chemical Industry Co., Ltd. The molecular weight of the vinyl chloride-vinyl acetate copolymer resin is preferably 30,000 or less. An ink using the resin having a molecular weight of 30,000 or less as a binder resin can be suitably ejected from an inkjet head and hence can suitably perform recording on a polyvinyl chloride base material.

Examples of the binder resin other than those described above include: an epoxy resin; a phenol resin; a novolac resin; a rosin-modified phenol resin; amino resins such as melamine and benzoguanamine; a polyamide resin; cellulose ester resins such as a cellulose diacetate, a cellulose triacetate, a nitrocellulose, a cellulose nitrate, a cellulose propionate, and a cellulose acetate butyrate; and cellulose ether resins such as a methyl cellulose, an ethyl cellulose, a benzyl cellulose, a trityl cellulose, a cyanoethyl cellulose, a carboxymethyl cellulose, a carboxyethyl cellulose, and an aminoethyl cellulose. Further, these resins may be used in combination. The content of the binder resin in the ink is preferably 1 to 20 wt %, particularly preferably 1 to 10 wt %. A content of the resin of less than 1 mass % is not preferred because the adhesion to the base material may be insufficient. A content of more than 20 wt % is not preferred because the viscosity of the ink increases and hence the stable ejection performance may be impaired.

Examples of the pigment dispersant include a polyamide-based resin, a hydroxyl group-containing carboxylic acid ester, a salt of a long-chain polyaminoamide and a high-molecular-weight acid ester, a salt of a high-molecular-weight polycarboxylic acid, a salt of a long-chain polyaminoamide and a polar acid ester, a high-molecular-weight unsaturated acid ester, a modified polyurethane, a modified polyacrylate, a polyether ester type anion-based activator, a salt of a naphthalenesulfonic acid-formalin condensate, a salt of an aromatic sulfonic acid-formalin condensate, a polyoxyethylene alkyl phosphoric acid ester, a polyoxyethylene nonyl phenyl ether, and stearylamine acetate.

Specific examples of the pigment dispersant include Solsperse 5000 (phthalocyanine ammonium salt based), 13940 (polyester amine based), 17000 (fatty acid amine based), 24000 (polyalkylene imine based), and 32000 (polyester-polyamide based) manufactured by The Lubrizol Corporation, and AJISPER PB821 and PB822 (basic dispersant) manufactured by Ajinomoto Fine-Techno Co., Inc.

An organic solvent used for a general solvent-based ink may be used for the organic solvent for dissolving the binder resin.

Specific examples of the organic solvent include: alcohols such as methyl alcohol, ethyl alcohol, n-propyl alcohol, isopropyl alcohol, n-butyl alcohol, tridecyl alcohol, cyclohexyl alcohol, and 2-methylcyclohexyl alcohol; glycols such as ethylene glycol, diethyleneglycol, triethylene glycol, polyethylene glycol, propylene glycol, dipropylene glycol, and glycerol; glycol ethers such as ethylene glycol monomethyl ether, ethylene glycol monoethyl ether, ethylene glycol-monobutyl ether, ethylene glycol diethyether, ethylene glycol dimethyl ether, diethylene glycol monomethyl ether, diethyleneglycolmonoethylether, diethylene glycolmonobutyl ether, diethylene glycol ethyl methyl ether, diethylene glycol dimethyl ether, diethylene glycol diethy ether, diethylene glycol dibutyl ether, propylene glycol monomethyl ether, propylene glycol monoethyl ether, propylene glycol monobutyl ether, dipropylene glycol monomethyl ether, dipropylene glycol monoethyl ether, propylene glycol dimethyl ether, dipropylene glycol dimethyl ether, propylene glycol diethyl ether, dipropylene glycol diethyl ether, ethylene glycol monomethyl acetate, ethylene glycol monoethyl acetate, ethylene glycol monobutyl acetate, diethylene glycol monomethyl acetate, ethylene glycol monomethyl ether acetate, ethylene glycol monoethyl ether acetate, ethylene glycol monobutyl ether acetate, propylene glycol monomethyl ether acetate, propylene glycol monoethyl ether acetate, diethylene glycol monoethyl acetate, diethylene glycol monobutyl acetate, and triethylene glycol monobutyl ether; esters such as ethyl acetate, isopropyl acetate, n-butyl acetate, methyl lactate, ethyl lactate, and butyl lactate; and ketones such as acetone, methyl ethyl ketone, methyl isobutyl ketone, cyclohexanone, isophorone, and diacetone alcohol.

Other examples of the organic solvent include: aromatic compounds such as toluene and xylene; lactone-based solvents such as γ-butyrolactone and γ-valerolactone; and nitrogen-containing compounds such as N-methyl-2-pyrrolidone, N-ethyl-2-pyrrolidone, and acetonitrile. A plurality of those solvents can be used as a mixture as required. The amount of such solvent is desirably as small as possible in consideration of an influence on the base material of a recording medium, and its content in the ink is preferably 10 wt % or less.

In addition, various additives such as a plasticizer, a surface modifier, a UV inhibitor, a light stabilizer, and an antioxidant can each be used in the ink for inkjet recording.

The production process for the ink for inkjet recording is described below. First, the solvent and the binder resin are mixed, and then the mixture is preliminarily stirred with a stirring machine. The state is a state in which an undissolved gel-like substance remains in the solution. Next, the solution containing the gel-like substance is irradiated with an ultrasonic wave by using an ultrasonic wave irradiation apparatus. As a result, a solution free of any gel-like substance, that is, a solution in which the binder resin is dissolved in the solvent is obtained. At this time, the concentration of the binder resin is preferably made as high as possible in order that a solvent can be added as required in a subsequent step to make the concentration and viscosity of the solution to desired ones. Next, an ink for inkjet recording is obtained by adding the solvent in which the binder resin is dissolved to a pigment dispersion produced in advance with a pigment, a pigment dispersant, and a solvent. At this time, an additive is added as required.

Although the ultrasonic wave irradiation apparatus is used in the process as the step of eliminating the undissolved gel-like substance, i.e., crosslinking-deleting means for applying an external force to delete the crosslinking of the gel-like substance, a media disperser can be used for eliminating the undissolved gel-like substance instead of the ultrasonic wave irradiation apparatus. However, the ultrasonic wave irradiation apparatus is preferably used because the step is completed within a short time period.

A known apparatus can be used as the ultrasonic wave irradiation apparatus. An ultrasonic wave homogenizer is preferred and a continuous ultrasonic wave homogenizer is particularly preferred. The frequency of the ultrasonic wave is preferably 30 kHz or less, particularly preferably 10 to 30 kHz. Its amplitude preferably falls within the range of 20 to 60 μm. Although the number of times of circulation is influenced by the kind of the solvent, the kind of the resin, and the concentration of the resin, the solution is preferably circulated at 1 L/min five times or more, for example, when the resin concentration is around 10%.

Whether the dissolution is good or bad can be judged on the basis of the viscosity and the presence or absence of the gel-like residue as the undissolved component. As the dissolution progresses, the viscosity reduces and hence the amount of the gel-like residue as the undissolved component reduces.

In the case where the vinyl chloride-vinyl acetate copolymer resin produced by the suspension polymerization having a molecular weight of 20,000 to 30,000 and any one of the glycol monoacetate solvents used in examples and comparative examples to be described later are used, the dissolution is preferably performed so that the viscosity becomes 25 cp or less when the concentration of the vinyl chloride-vinyl acetate copolymer resin is 10%. In all cases, the dissolution is preferably performed to such a state that the viscosity in the system becomes as low as possible and the amount of the undissolved gel-like substance becomes as close to zero as possible in order that the property by which an ink to be obtained is stably ejected from an inkjet head may be obtained. In addition, combined use of a lactone-based solvent and a nitrogen-containing compound can improve the solubility of the resin.

A known disperser can be used as the media disperser, and examples thereof include a ball mill, an attritor, a basket mill, a sand mill, a sand grinder, a DYNO-MILL, a DISPERMAT, an SC-MILL, a SPIKE MILL, an agitator mill, and a glen mill. In particular, a continuous media disperser is preferred. As media, ceramic beads, glass beads, or steel beads are preferred. Of those, ceramic beads are particularly preferred because the contamination during dispersion is low. Of those, zirconia beads are particularly preferred because of, for example, the following reasons. The zirconia beads have high chemical stability, good wear resistance, good surface smoothness, a uniform particle size distribution, and so high a specific gravity that high impact-shear energy is obtained. Although dispersion conditions are influenced by the kind of the solvent, the kind of the resin, and the concentration of the resin, large energy is not needed for the dispersion and dissolution because the gel-like undissolved component of the resin is soft. Accordingly, the following dispersion conditions are preferred in terms of productivity: the diameter of each of the media is relatively small, their filling ratio is high, and the number of times of collision is increased. For example, when the resin concentration is around 10%, the diameter of each of the media is preferably 1.5 mm or less, and is particularly preferably 0.05 to 0.5 mm because good productivity is achieved. A rotational speed is preferably 1,000 rpm or more, and is particularly preferably 3,500 rpm or more because good productivity is achieved. Although the number of times of circulation is dependent on the volume of a vessel, the solution is preferably circulated ten times or more, for example, when the volume is around 50 cc. The filling ratio of the media is preferably 80% or more, and is preferably 90% or more in order that the productivity may be improved. Whether the dissolution of a resin varnish is good or bad can be judged on the basis of the viscosity and the presence or absence of the gel-like residue as the undissolved component. As the dissolution progresses, the viscosity reduces and hence the amount of the undissolved residue reduces.

In the case where the vinyl chloride-vinyl acetate copolymer resin produced by the suspension polymerization having a molecular weight of 20,000 to 30,000 and any one of the glycol monoacetate solvents used in examples and comparative examples to be described later are used, the dissolution is preferably performed so that the viscosity becomes 25 cp or less when the concentration of the vinyl chloride-vinyl acetate copolymer resin is 10% in the solution. In all cases, the dissolution is preferably performed to such a state that the viscosity in the system becomes as low as possible and the amount of the gel-like residue as the undissolved component becomes as close to zero as possible in order that the property by which an ink to be obtained is stably ejected from an inkjet head may be obtained. In addition, combined use of a lactone-based solvent and a nitrogen-containing compound can improve the solubility of the resin.

When a stirring step with a blade or a media-less dispersion step is performed as a step prior to the ultrasonic wave irradiation step or the media dispersion step, the productivity of each of the ultrasonic wave irradiation step and the media dispersion step can be improved.

A known product can be particularly used in each of the stirring step with the blade and the media-less dispersion step, and examples thereof include a magnetic stirrer, a three-one motor, a homomixer, a nanomizer, a pressure-type homogenizer, a dissolver, a Disper, and a high-speed impeller disperser. The solubility of the resin is improved by heating the solvent to 50° C. or more at the time of the stirring or dispersion.

Although a sufficient level of dissolution cannot be achieved merely by the stirring with the blade or the media-less dispersion, the dissolution is preferably performed to such a state that the viscosity becomes as low as possible in order that the productivity of a subsequent step may be improved. In the case where the vinyl chloride-vinyl acetate copolymer resin produced by the suspension polymerization having a molecular weight of 20,000 to 30,000 and any one of the glycol monoacetate solvents used in the examples and comparative examples to be described later are used, the dissolution can be performed so that the viscosity becomes around 27 cp when the resin concentration is 10%.

In addition, a dispersant made of a water-soluble resin such as a water-soluble cellulose ether, a water-soluble cellulose ester, or a water-soluble polymer remains in a trace amount in the vinyl chloride-vinyl acetate copolymer resin produced by the suspension polymerization to be used in the ink for inkjet recording. For example, the dispersant remains at a weight ratio of about 50 to 10,000 ppm, though the remaining amount varies to some extent depending on a difference in production process. Accordingly, the ink for inkjet recording to be produced also contains a trace amount of such dispersant.

In addition, the ink for inkjet recording is used in a state of being stored in an ink cartridge in an inkjet printer. The ink cartridge is described with reference to FIG. 1.

FIG. 1 is an exploded perspective view of an ink cartridge according to a preferred embodiment of the present invention.

An ink cartridge 1 is provided with a flexible pouch (ink bag) 2 storing the ink for inkjet recording in itself, and an upper case 3 and a lower case 4 for storing the pouch 2. The ink for inkjet recording is stored in the pouch 2. The upper case 3 and the lower case 4 are caused to engage with each other to store the pouch 2 in themselves. The pouch 2 is constituted as described below in order that its gas barrier property may be improved. An aluminum laminate film is obtained by sandwiching an aluminum foil between two films such as a nylon film as an outer side film and a polyethylene film as an inner side film. Two such aluminum laminate films are superimposed on each other, and then their margins are joined by thermal welding or the like. The pouch 2 is provided with an ink output port 5 for discharging the ink stored in the pouch to the outside at one end thereof. In order that the ink in the pouch 2 may be supplied to the outside, the lower case 4 is provided with a hole from which the ink output port 5 is exposed. The ink cartridge 1 is produced by steps including the step of filling and storing the ink for inkjet recording in the pouch 2, and the step of storing the pouch 2 in the upper case 3 and the lower case 4. In addition, the filling of the ink for inkjet recording preferably includes a step including charging the ink from the opening portion of the pouch 2 in a vacuum chamber, deaerating the pouch, and sealing the opening portion. Although the ink cartridge 1 illustrated in FIG. 1 storing the ink for inkjet recording is a preferred embodiment of the ink cartridge of the present invention, the ink cartridge of the present invention is not limited to the ink cartridge of this embodiment.

EXAMPLES

Hereinafter, the present invention is specifically described by way of examples, but the present invention is not particularly limited to the examples. It should be noted that, in the examples, the term "part (s)" denotes "part (s) by weight."

An ink is produced by producing a pigment dispersion with a pigment, a pigment dispersant, and a solvent in advance, and adding a vehicle for an ink in which a binder resin is dissolved and any other additive to the pigment dispersion.

The vehicle for an ink in which the binder resin was dissolved was produced so as to have a concentration of 10% and then subjected to pre-dissolution with a stirring machine, followed by dissolution by an ultrasonic wave irradiation step or a media dispersion step. Stirring was performed with a stirring machine in an ink production process.

Example 1

A vehicle for an ink in which a binder resin was dissolved was produced so as to have a binder resin concentration of 10%, and a vinyl chloride-vinyl acetate copolymer resin produced by suspension polymerization was dissolved in a mixed solvent of ethylene glycol monobutyl ether acetate and γ-butyrolactone. A pre-dissolving step of stirring the solution with a stirring machine at 1,200 rpm for 4 hours while warming the solution to 60° C. was performed.

After that, dissolution was performed with a continuous media disperser PICO MILL PCM-LR (manufactured by ASADA IRON WORKS CO., LTD.). Zirconia beads having a media diameter of 0.1 mm were loaded as media into a mill stirring portion at a filling ratio of 90% and a 50-μm screen was used in a bead-separating portion. 600 grams of the solution obtained in the pre-dissolving step in which the binder resin was dissolved at a concentration of 10%, the solution having a viscosity of 26.89 cp, were collected in a storage tank, and then a stirring rotor was rotated at 3,819 rpm (a peripheral speed of 12 m/sec) for 60 minutes while the solution was circulated at a flow rate of 360 g/min between the mill stirring portion and the storage tank. The viscosity reduced to 24.11 cp and no gel-like residue was observed.

At the time of the production of an ink, the vehicle for an ink in which the binder resin was dissolved was added to the pigment dispersion while the pigment dispersion was stirred at 1,000 rpm with a stirring machine, and then the viscosity was adjusted to 10.5 cp while the solvent was added. Table 1 summarizes the composition of the ink. The pigment, the pigment dispersant, the solvents, the binder resin, and the like are prepared so that the total amount of the ink is 100 parts.

TABLE 1

| Pigment | Phthalocyanine pigment | 4.0 parts |
| Pigment dispersant | Polyalkyeneimine-based pigment dispersant | 1.4 parts |
| Solvent | Ethylene glycol monobutyl ether acetate | 84.6 parts |
| Binder resin | Vinyl chloride-vinyl acetate copolymer resin (suspension polymerization) | 5.0 parts |
| Solvent | Lactone-based solvent | 5.0 parts |

Example 2

A vehicle for an ink in which a binder resin was dissolved was produced so as to have a resin concentration of 10%, and a vinyl chloride-vinyl acetate copolymer resin produced by suspension polymerization was dissolved in ethylene glycol monobutyl ether acetate. A pre-dissolving step of stirring the solution with a stirring machine at 1,200 rpm for 4 hours while warming the solution to 60° C. was performed.

After that, dissolution was performed with a continuous media disperser PICO MILL PCM-LR (manufactured by ASADA IRON WORKS CO., LTD.). Zirconia beads having a media diameter of 0.1 mm were loaded as media into a mill stirring portion at a filling ratio of 90% and a 50-μm screen was used in a bead-separating portion. 600 Grams of the vehicle for an ink obtained in the pre-dissolving step in which the binder resin was dissolved at a concentration of 10%, the vehicle having a viscosity of 26.76 cp, were collected in a storage tank, and then a stirring rotor was rotated at 3,819 rpm (a peripheral speed of 12 m/sec) for 60 minutes while the vehicle was circulated at a flow rate of 360 g/min between the mill stirring portion and the storage tank. The viscosity reduced to 24.25 cp and no gel-like residue was observed.

At the time of the production of an ink, the vehicle for an ink in which the binder resin was dissolved was added to the pigment dispersion while the pigment dispersion was stirred at 1,000 rpm with a stirring machine, and then the viscosity was adjusted to 10.5 cp while the solvent was added. Table 2 summarizes the composition of the ink. The pigment, the pigment dispersant, the solvents, the binder resin, and the like are prepared so that the total amount of the ink is 100 parts.

TABLE 2

| Pigment | Quinacridone pigment | 4.0 parts |
| Pigment dispersant | Polyalkyeneimine-based pigment dispersant | 1.5 parts |
| Solvent | Dipropylene glycol monoethyl ether | 6.9 parts |
| Binder resin | Vinyl chloride-vinyl acetate copolymer resin (suspension polymerization) | 3.6 parts |
| Solvent | Ethylene glycol monobutyl ether acetate | 84.0 parts |

Example 3

The procedure up to the pre-dissolving step with a stirring machine for the vehicle for an ink in which the binder resin is dissolved is the same as that of Example 1. A treatment subsequent thereto was changed to one to be performed with a continuous ultrasonic wave disperser ULTRASONIC GENERATOR GSD1200AT (manufactured by GINSEN Co., Ltd.).

An irradiation portion holder was attached to the tip of the ultrasonic wave irradiation portion of the continuous ultrasonic wave disperser ULTRASONIC GENERATOR GSD1200AT (manufactured by GINSEN Co., Ltd.) having a tip diameter of 50 mm, and then 2 L of the vehicle for an ink obtained in the pre-dissolving step in which the binder resin was dissolved at a concentration of 10%, the vehicle having a viscosity of 26.89 cp, were charged into a storage tank. The vehicle was irradiated with an ultrasonic wave having a frequency of 19.5 kHz and an amplitude of 30 µm by using the disperser at the ultrasonic wave irradiation portion while being circulated at a flow rate of 1 L/min between an ultrasonic wave-generating portion and the storage tank for 20 minutes. The viscosity reduced to 23.78 cp and no gel-like residue was observed.

At the time of the production of an ink, the vehicle for an ink in which the binder resin was dissolved was added to the pigment dispersion while the pigment dispersion was stirred with a stirring machine, and then the resultant was adjusted while the solvent was added.

Comparative Example 1

The vehicle for an ink in which the binder resin was dissolved used in Example 1 was not subjected to any treatment subsequent to the pre-dissolving step with a stirring machine. The vehicle for an ink in which the binder resin was dissolved after the pre-stirring step had a viscosity of 26.89 cp. When a residue evaluation was performed, a gel-like residue was observed.

Comparative Example 2

A treatment subsequent to the pre-dissolving step with a stirring machine for the vehicle for an ink in which the binder resin was dissolved used in Example 1 was changed to one to be performed with a DESPA MILL (manufactured by ASADA IRON WORKS CO., LTD.) as a media-less disperser. 3 Liters of the vehicle for an ink obtained in the pre-dissolving step in which the binder resin was dissolved at a concentration of 10%, the vehicle having a viscosity of 26.89 cp, were collected in a storage tank, and were then stirred with the rotor of the batch-type media-less disperser DESPA MILL MD-3 (manufactured by ASADA IRON WORKS CO., LTD.) at 15,000 rpm (a peripheral speed of 40 m/s) for 2 hours. When viscosity and residue evaluations were performed, the viscosity was found to reduce to 24.71 cp but a gel-like residue was observed.

Comparative Example 3

The binder resin of Example 1 was changed to a vinyl chloride-vinyl acetate copolymer resin produced by solution polymerization and no treatment subsequent to the pre-dissolving step with a stirring machine was performed. The viscosity was 30.30 cp. When a residue evaluation was performed, no gel-like residue was observed.

Ink production was performed in the same manner as in Example 1 with the vehicle for an ink in which the binder resin was dissolved obtained in each of Example 3 and Comparative Example 1 to Comparative Example 3.

A gel-like residue in the vehicle for an ink in which the binder resin was dissolved obtained in each of Examples 1 to 3 and Comparative Examples 1 to 3 was observed. In addition, an ink for inkjet recording produced with the vehicle was tested and measured for stable ejection performance and ink storage stability by the following respective methods. The results were evaluated by the following criteria.

<Observation of Gel-Like Residue>

The presence or absence of a gel-like undissolved component was evaluated by the observation of a glass filter with a 2-µm mesh after filtration with the filter. The results were classified as described below and shown in the table.

○: No gel-like undissolved component was observed.
x: A gel-like undissolved component was observed.

<Stable Ejection Performance>

A continuous ejection performance evaluation was performed with a 508 Greyscale Head manufactured by SII Printek Inc. The evaluation was performed as to whether or not an ink could be continuously ejected first in 1 drop at an ejection speed of 6.8 m/s and an ejection frequency of 18.5 kHz, and then in 2 drops at the same speed and an ejection frequency of 14.0 kHz in a normal fashion for 30 seconds or more. For example, when an ejection failure occurred, the ink was evaluated as being unable to be continuously ejected in a normal fashion. The results were classified as described below and shown in the table.

○: The ink was able to be continuously ejected in a normal fashion.
x: The ink could not be continuously ejected in a normal fashion.

<Ink Storage Stability>

An evaluation was performed as to whether or not at least one of the viscosity of an ink and the particle diameter of its pigment changed by ±10% or more after its storage at −15° C. for 2 weeks. The viscosity of the ink was measured with a VISCOMETER TV-33. The particle diameter of the pigment of the ink was an average particle diameter (d50) measured with a laser diffraction-type particle size distribution-measuring device. The results were classified as described below and shown in the table.

○: The viscosity and the particle diameter each changed by ±10% or less.
x: At least one of the viscosity and the particle diameter changed by ±10% or more.

The results of the evaluations were as shown in Table 3.

TABLE 3

| | Observation of gel-like residue | Stable ejection performance | Ink storage stability | Polymerization method for binder resin | Treatment subsequent to pre-dissolving step |
|---|---|---|---|---|---|
| Example 1 | ○ | ○ | ○ | Suspension | Media dispersion |
| Example 2 | ○ | ○ | ○ | Suspension | Media dispersion |
| Example 3 | ○ | ○ | ○ | Suspension | Ultrasonic wave irradiation |
| Comparative Example 1 | x | x | x | Suspension | None |
| Comparative Example 2 | x | x | x | Suspension | Media-less dispersion |
| Comparative Example 3 | ○ | ○ | ○ | Solution | None |

Comparison between the results of Example 1 to Example 3 and Comparative Example 1 to Comparative Example 3 shows that when a polymerization method for a binder resin is the suspension polymerization, the binder resin can be satisfactorily dissolved in a solvent by media dispersion with a media disperser or ultrasonic wave irradiation with an ultrasonic wave irradiation apparatus. Thus, a vehicle for an ink in which no gel-like component remains can be produced. It is also found that at this time, the binder resin can be satisfactorily dissolved in the solvent even without the addition of any lactone-based solvent.

The present invention can be utilized in an inkjet recording apparatus and a vehicle for an ink to be used in an ink for the apparatus, a production method for the vehicle for an ink, an ink for inkjet recording, a production method for the ink for inkjet recording, an ink cartridge, and a production method for the ink cartridge.

| Reference Signs List | |
|---|---|
| 1 | ink cartridge |
| 2 | pouch |
| 3 | upper case |
| 4 | lower case |
| 5 | ink output port |

The invention claimed is:

1. A production method for a vehicle for an ink comprising a vinyl chloride-vinyl acetate copolymer resin dissolved as a binder resin in a solvent, the vinyl chloride-vinyl acetate copolymer resin being produced by suspension polymerization, the method comprising:
   a pre-dissolving step of partially dissolving the vinyl chloride-vinyl acetate copolymer resin produced by the suspension polymerization in the solvent to such a state that an undissolved gel-like component thereof is incorporated; and
   a gel-like component-dissolving step of applying an external force to the solvent containing the gel-like component to dissolve the gel-like component in the solvent.

2. A production method for a vehicle for an ink according to claim 1; wherein the external force of the gel-like component-dissolving step comprises acoustic wave irradiation generated by an acoustic wave irradiation apparatus.

3. A production method for a vehicle for an ink according to claim 1; wherein the external force of the gel-like component-dissolving step comprises ultrasonic wave irradiation generated by an ultrasonic wave irradiation apparatus.

4. A production method for a vehicle for an ink according to claim 1; wherein the external force of the gel-like component-dissolving step comprises media dispersion by a media disperser.

5. A production method for a vehicle for an ink according to claim 1; wherein the pre-dissolving step comprises stirring the vehicle with a stirring machine while heating the vehicle to partially dissolve in the solvent the vinyl chloride-vinyl acetate copolymer resin produced by the suspension polymerization.

6. A production method for a vehicle for an ink according to claim 1; wherein the vinyl chloride-vinyl acetate copolymer resin has a molecular weight of 20,000 to 30,000.

7. A production method for a vehicle for an ink according to claim 1; wherein a water-soluble resin remains in the vinyl chloride-vinyl acetate copolymer resin.

8. A production method for an ink for inkjet recording, comprising: adding an ink vehicle produced by the production method according to claim 1 to a pigment dispersion having at least a pigment and a pigment dispersant.

9. A production method for an ink cartridge, comprising the steps of: storing in a pouch an ink for inkjet recording produced by the production method for an ink for inkjet recording according to claim 1; and storing the pouch in a case.

10. An ink for inkjet recording, comprising: an ink vehicle produced by the production method according to claim 1; a pigment; and a pigment dispersant.

11. An ink cartridge, comprising: a pouch storing an ink for inkjet recording according to claim 10; and a case for storing the pouch.

12. A vehicle for an ink, comprising: a vinyl chloride-vinyl acetate copolymer resin that is produced by suspension polymerization and that is dissolved in a solvent in a state in which an undissolved gel-like component present in the solvent is dissolved in the solvent by application of an external force to the solvent.

13. A vehicle for an ink according to claim 12; wherein the vinyl chloride-vinyl acetate copolymer resin contains a water-soluble resin.

14. An ink for inkjet recording, comprising: an ink vehicle according to claim 12; a pigment; and a pigment dispersant.

15. An ink cartridge, comprising: a pouch storing an ink for inkjet recording according to claim 14; and a case for storing the pouch.

16. An ink cartridge storing an ink for inkjet recording according to claim 15.

17. A method of producing an ink vehicle, comprising:
   producing a vinyl chloride-vinyl acetate copolymer resin by suspension polymerization;
   partially dissolving the produced vinyl chloride-vinyl acetate copolymer resin in a solvent in a state in which an undissolved gel-like component of the vinyl chloride-vinyl acetate copolymer resin is present in the resin; and
   applying an external force to the solvent containing the gel-like component to dissolve the gel-like component in the solvent.

18. A method according to claim 17; wherein the applying step comprises applying the external force using ultrasonic wave irradiation.

19. A method according to claim 17; wherein the applying step comprises applying the external force by media dispersion.

20. A method according to claim 17; wherein the partially dissolving step comprises stirring the vehicle with a stirring machine while heating the vehicle to partially dissolve in the solvent the vinyl chloride-vinyl acetate copolymer resin.

* * * * *